Figure 1:
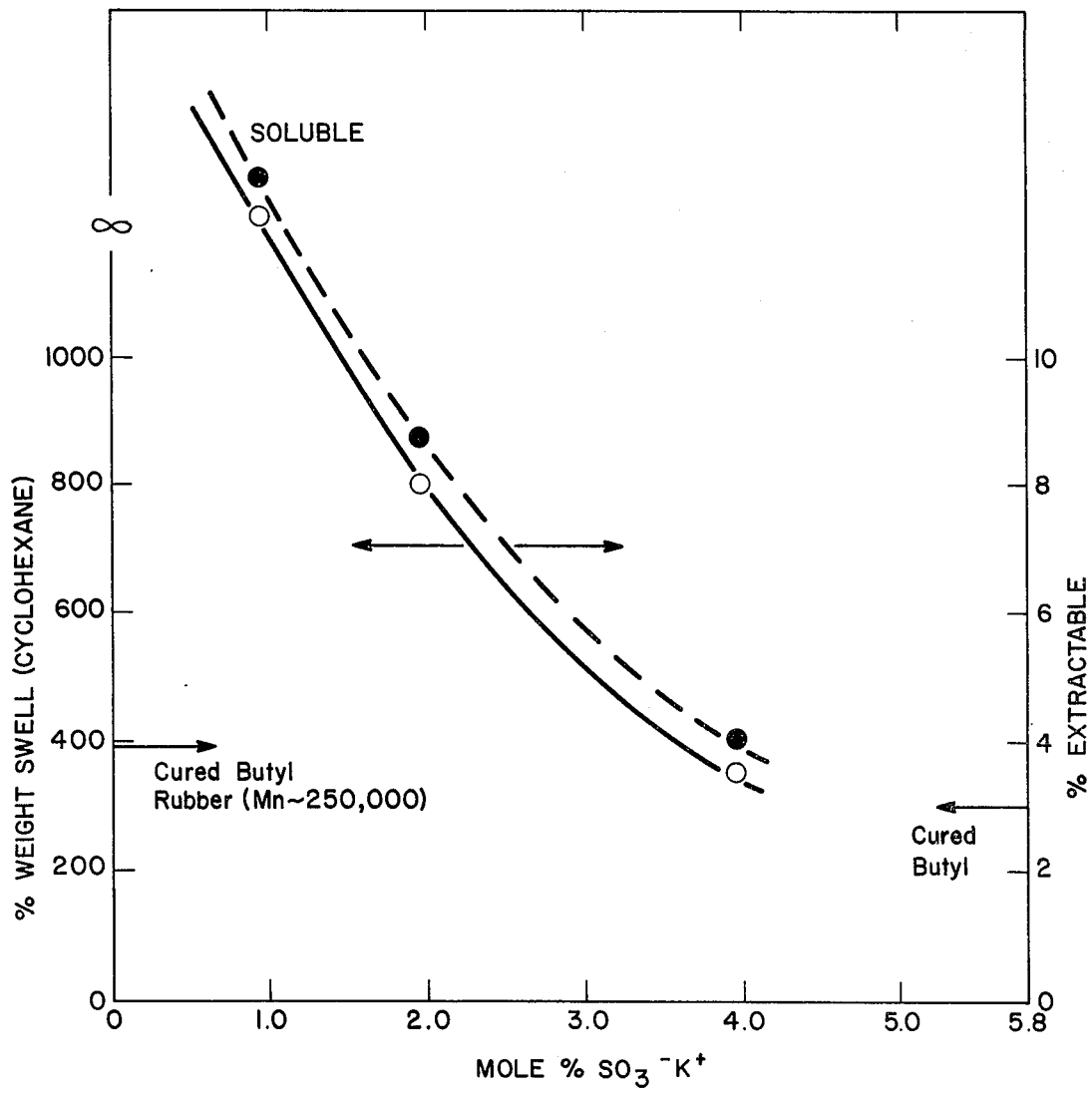

United States Patent [19]
Gorbaty et al.

[11] 3,903,039
[45] Sept. 2, 1975

[54] SULFONATED TERPOLYMERS AND USES THEREOF

[75] Inventors: Martin L. Gorbaty, Fanwood; Nathan H. Canter, Edison, both of N.J.

[73] Assignee: Exxon Research and Engineering Company, Linden, N.J.

[22] Filed: Oct. 11, 1973

[21] Appl. No.: 405,430

[52] U.S. Cl... 260/33.4 PQ; 260/41.5 R; 260/79.3 R; 260/80.7
[51] Int. Cl.² .......................................... C08F 28/00
[58] Field of Search........ 260/33.4 PQ, 79.3 R, 80.7

[56] References Cited
UNITED STATES PATENTS

| | | | |
|---|---|---|---|
| 2,356,128 | 8/1944 | Thomas et al. | 260/79.5 |
| 2,577,822 | 12/1951 | Sparks et al. | 260/80.7 |
| 3,080,337 | 3/1963 | Minckler et al. | 260/80.7 |
| 3,642,728 | 2/1972 | Canter | 260/79.3 R |
| 3,779,974 | 12/1973 | Hubbard et al. | 260/79.3 R |

*Primary Examiner*—Ronald W. Griffin
*Attorney, Agent, or Firm*—Robert J. Baran

[57] ABSTRACT

This invention relates to novel, sulfonated terpolymers and the uses thereof. The novel, sulfonated terpolymers of the instant invention preferably have a molecular weight from 5,000 to 250,000, and are prepared by the sulfonation of a polymer obtained by the polymerization of an isoolefin, a conjugated diene, and a cyclic diolefin. The sulfonation reaction may be carried out by use of a complex of a Lewis base with a sulfur trioxide donor. The low molecular weight sulfonated polymers of the instant invention may be neutralized by reaction with inorganic or organic bases. The neutralized low molecular weight polymers of the instant invention, i.e. a molecular weight range of from 5,000 to 45,000, when combined with a plasticizer which interacts with the sulfonate group, e.g. an alcohol, show useful properties as coatings and mastics.

16 Claims, 1 Drawing Figure

NETWORK FORMATION IN SULFONATED ISOBUTYLENE-CYCLOPENTADIENE COPOLYMER (Mn~36,000)

SULFONATED TERPOLYMERS AND USES THEREOF

SUMMARY OF THE INVENTION

1. Field of the Invention

This invention relates to novel, sulfonated terpolymers and the uses thereof. The novel, sulfonated terpolymers of the instant invention preferably have a molecular weight from 5,000 to 250,000, and are prepared by the sulfonation of a polymer obtained by the polymerization of an isoolefin, a conjugated diene, and a cyclic diolefin. The sulfonation reaction may be carried out by use of a complex of a Lewis base with a sulfur trioxide donor. The low molecular weight sulfonated polymers of the instant invention may be neutralized by reaction with inorganic or organic bases. The neutralized low molecular weight polymers of the instant invention, i.e. a molecular weight range of from 5,000 to 45,000, when combined with a plasticizer which interacts with the sulfonate group, e.g. an alcohol, show useful properties as coatings and mastics.

2. Background of the Invention

Rubber products are manufactured from noncrosslinked polymer. After fabrication, vulcanization introduces the required elastic response. The crosslinking of rubber is essential for its use but entails three significant disadvantages. First, chemical crosslinking reactions involve considerable time. Second, once the chemical bonds are formed they cannot be broken easily so that waste materials and off-specification rubber cannot be refabricated readily. Third, in order to obtain adequate physical properties in the end product, the number average molecular weight of the elastomer must be high (of the order of 100,000 or greater). These high molecular weights impart polymers with high shear viscosities. The high viscosity makes fabrication more difficult. The present invention provides a method to alleviate all three of these problems simultaneously. The invention comprises utilizing sulfonated polymers with adequate functionality to form stable elastomeric networks. The sulfonate units are plasticized by polar agents to impart the materials with thermoplasticity.

Sulfonated elastomers are disclosed in U.S. Pat. No. 3,642,728. This patent contains a broad, general teaching as to sulfonated elastomers which may contain cyclic olefin unsaturation in the polymer chain. However, there is no teaching as to the good aging properties of sulfonated copolymers having the specific amounts of unsaturation of the polymers of the instant invention.

U.S. Pat. No. 2,577,822 and 3,080,337 show that in a butyl rubber polymer the incorporation of a cyclic olefin in the backbone yields improved resistance to ozone. However, it is clear from the disclosure of these patents that resistance to heat aging in oxygen is not improved. For example, see Table IV of U.S. Pat. No. 3,080,337.

It is an object of the instant invention to provide compositions having good resistance to degradation by ozone or oxygen and/or heat. It is a further object of the instant invention to provide coatings which cure in the presence of air at ambient conditions. It is a further object of the instant invention to provide polymer compositions which may be compounded with fillers, pigments, extender oils, etc., to yield stable mixtures. It is a further object of the instant invention to provide mastic and adhesive formulations having high solids content; that is, low solvent content and low viscosity. A further object of the invention is to provide low viscosity adhesive and mastic formulations having good tensile strength when applied. It is a further object of the instant invention to provide adhesive and mastic formulations which dry to a tack-free state within short time periods at ambient conditions. Further objects of the instant invention will be apparent from the description below.

It has now been found that novel compositions of matter which have properites enabling the skilled artisan to obtain the above objectives result from the sulfonation of a terpolymer containing an isoolefin, an acyclic conjugated diolefin, and a cyclic diolefin. The isoolefin will have from 4 to 8 carbon atoms and will include isobutylene, 3-methyl-1-butene, etc. The acyclic conjugated diolefin will contain 4 to 7 carbon atoms and will include isoprene, butadiene, piperylene, 2,3-dimethylbutadiene, 2-methylpentadiene, etc. The cyclic diolefin, which may or may not be conjugated, will contain from 5 to 12 carbon atoms and will include cyclopentadiene, 1,3-cyclohexadiene, methyl and ethyl derivatives thereof; $\beta$-pinene; etc.

Preferably, the above-described polymer will comprise from 80 to 96, more preferably from 85 to 94, wt. % isoolefin; from 1 to 10, more preferably from 2 to 6, wt. % conjugated olefin; and from 3 to 10, more preferably from 4 to 9, wt. % cyclic diolefin.

The number average molecular weight of this polymer will vary from 5,000 to 1,000,000, preferably from 5,000 to 250,000. The polymers which best achieve the objectives described above are the low molecular weight species, that is, polymers having a molecular weight of from 5,000 to 45,000.

The terpolymers useful in preparing the sulfonated polymers of the instant invention may be prepared by cationic polymerization of a mixture of isoolefin, conjugated diene and cyclodiolefin at low temperatures in a homogeneous process. See, for example, U.S. Ser. No. 151,038, now U.S. Pat. No. 3,808,177. Isobutylene polymers are preferred terpolymers for use in preparing the novel compositions of the instant invention. Isobutylene terpolymers possess an advantage for sulfonation. These polymers, because of chain transfer during polymerization contain unsaturated units at the chain end. Sulfonated chain ends, because of ionic associations with sulfonate groups on other polymer chains, are tied into the polymer network, thus greatly increasing the apparent molecular weight, with an attendant increase in polymer physical properties, e.g. tensile. The probability of incorporating a chain end into the network is in proportion to the ratio of sulfonation level to total unsaturation in the chain. This is particularly important in preparing the preferred low molecular weight compositions.

The above terpolymers are sulfonated to prepare the novel polymers of the instant invention. Methods for sulfonating polymers of this sort are known in the art. For example, see references cited in U.S. Pat. No. 3,642,728. Typically, the unsaturated terpolymer is dissolved in a hydrocarbon or chlorinated hydrocarbon solvent and contacted with a sulfonation agent comprised of a Lewis base and a sulfur trioxide donor.

Preferably, the polymers are sulfonated by a dioxane-$SO_3$ complex, triethyl phosphate-$(SO_3)_x$ complexes where $x = 1$ to 5, tetrahydrofuran-$SO_3$, diethyl ether-$SO_3$, or the compound formed from acetic acid and $SO_3$ or its equivalent formed from acetic anhydride and sulfuric acid. These reagents are dissolved preferably in a carrier medium, e.g. chlorinated aliphatic or aromatic hydrocarbons. The sulfonation reactions may be carried out from 25 seconds to 100 hours, preferably 2 minutes to 2 hours at temperatures from about −50°C to +120°C, preferably 0° to 80°C. The resultant sulfonic acid polymers may be used as such or preferably neutralized as described below. Preferably the sulfonated polymers of the instant invention will comprise from 1 to 8.0 mole % sulfonic acid groups.

The sulfonic acid group may be neutralized by means of a basic material, for example sodium hydroxide. In general, neutralizing agents which are useful for neutralizing the polymers of the instant invention include ammonia; amines, e.g. primary, secondary and tertiary, preferably having from 1 to 20 carbon atoms; basic metal salts and hydroxides or organometallic compounds, e.g. salts and hydroxides selected from Groups I, II, III, IV, V, VIB, VIIB and VIII of the Periodic Table of the Elements, such as, KOH, CsOH, $Mg(OH)_2$, $Ca(OH)_2$, calcium acetate, $Ba(OH)_2$, barium acetate, lead acetate, lead stearate, barium stearate, magnesium stearate, zinc acetate, aluminum stearate, zinc stearate, aluminum acetate, etc.; and mixtures thereof. Organometallic compounds include compounds containing $C_1$ to $C_{10}$ hydrocarbyl radicals bound covalently to a metal selected from Groups I, II or III of the Periodic Table of the Elements, e.g. n-butyl lithium, benzyl sodium, n-hexyl potassium, diethyl calcium, tri-n-propyl aluminum etc.

The sulfonated terpolymers of the instant invention may be neutralized to a degree of from 5 to 500%, more preferably from 50 to 100%. The preferred materials for effecting neutralization are the above described basic metal salts.

The sulfonated polymers of the instant invention are elastomeric in nature and unsaturated. The degree of total unsaturation varies from 4 mole % to 20 mole %, preferably from 6 mole % to 15 mole %. In the preferred low molecular weight compositions of the instant invention, it is important that the unsaturation present in the polymer be resistant to cleavage by oxygen, ozone, etc. These compositions, being already at low molecular weight levels, rapidly lose their desirable properties, e.g. tensile strength, as cleavage proceeds. Thus, compositions formed from enchained cyclopentadiene or methylcyclopentadiene units in the polymer backbone are preferred.

As expected from U.S. Pat. No. 3,642,728, it has been found that sulfonation of high molecular weight terpolymers affords products whose properties are also attainable by chemical vulcanization. However, sulfonation of the lower molecular weight species, yields unpredictable and unexpected properties which cannot be attained by the conventional crosslinking methods. As will be shown subsequently by example, these lower molecular weight elastomers have strength properties which are improved by 2–10 fold over the conventionally cured material of the same molecular weight. The lower molecular weight products of the present invention can be used in areas where high molecular weight polymers have been used traditionally. The present products have the advantage that chemical vulcanization is not required. These materials are low molecular weight thermoplastic elastomers. However, if curing is desired, it can be effected by conventional procedures, which utilize the residual unsaturation units. The products can be compounded with carbon black, mineral fillers, or extended with oil, provided that the agents do not contain species which are harmful toward the ionic associations or hydrogen bonds (in the case of $SO_3H$ containing polymers). The various polymers may be blended with one another or with higher molecular weight rubbers, whether sulfonated or not. The materials could also be used to improve the impact strength of plastics.

In addition to molding in solid form, the products are soluble and may be cast from solution to form an adhesive coating or caulk. Compounding may be done in the solid state or solution.

When utilized as one component-elastomeric coatings, the compositions of this invention must be treated with materials which will disrupt the ionic associations sufficiently so that said compositions may be either placed into solution or freely flowed from a melt processing device. These materials may be designated as preferential plasticizers for the ionic associations. When cast as films, the solvent(s) will evaporate, allowing the associations to reform, thus leaving a through-cured elastomeric film. In one embodiment of the present invention thhe disrupting material will be volatile to enable reforming of the ionic associations upon drying. For example, materials such as methanol, ethanol, isopropanol, butanol, cyclohexanol, etc. are acceptable, but $>C_{10}$ alcohols are not volatile enough for this manner of use. The preferred amounts of these preferential plasticizers are limited since at high levels they can cause the polymer to precipitate prematurely from solution. Ranges from 3 to 30% based on the weight of polymer are preferred.

The low molecular weight compositions of the instant invention are useful for adhesives, coatings, and as mastics. In these applications preferably the sulfonic acid group is neutralized by use of the metal salts and hydroxides, further described above. Metal counterions, e.g. $K^+$, $Ca^{+2}$, $Sr^{+2}$, $Ba^{+2}$, $Pb^{+2}$, $Al^{+3}$, etc. are preferred because they allow the formation of strong physical associations. Compositions of this type, although having very low molecular weight, show outstanding tensile properties. It is believed that the sulfonate groups form strong crosslinks through ionic associations.

The preferential plasticizers which are useful within the scope of the instant invention are materials having at least one functional group with a bond moment greater than 0.9 debyes, more preferably from 1,2 to 5.5 debyes and include both volatile and nonvolatile compounds. The volatile compounds of the instant invention have a substantial vapor pressure at the temperature at which the compositions prepared by compounding the preferential plasticizer with the sulfonated polymer of the instant invention will be utilized. Examples of volatile compounds which may be used herein include alcohols having up to 10 carbon atoms, e.g. methanol, ethanol, propanol, n-butanol, secondary butanol, isobutanol, isopropanol, pentanol, hexanol, heptanol, decanol, benzyl alcohol, octanol, 2-ethylhexanol, etc. Water can be used for a similar purpose. Other less preferred compounds include $C_1$ to $C_{20}$ thiols, such as methanethiol, ethanethiol, propanethiol, etc. Nonvolatile compounds which are useful as preferential plasticizers within the scope of the instant invention include decanoic acid, p-toluic acid, 3,4- dimethylbenzoic acid, etc. For other examples see the class of nonvolatile preferential plasticizers described in U.S. Ser. No. 103,902, hereby incorporated by reference.

The instant low molecular weight sulfonated polymers may be utilized to prepare one component elastomeric coatings. For example, from 5–50% of said polymer may be admixed with from 95–50% of a suitable inert solvent, such as toluene, hexane, heptane, varsol etc., containing from 3–30% preferably from 5–15% based on polymer weight of one of the above-described plasticizers. By inert solvent is meant a solvent which does not substantially affect the ionic associations in the polymer but instead provides a medium for dissolution of the plasticized polymer. These compositions can be applied by casting, painting, spraying, etc., and dry to high strength, elastomeric products. They are particularly valuable in that these compositions are one-component systems, i.e., curatives need not be added just before use.

These compositions, because of their residual unsaturation, are also curable at atmospheric conditions. More specifically, the unsaturation due to the residual double bond in the cyclic part of the backbone can react so as to crosslink in contact with air. Thus, the instant compounds have good initial tensile strength and further cure in the presence of air to yield tough, tack-free coatings. The air dry cure may be accelerated further by use of heat and/or catalyst.

Surprisingly, the compositions of the instant invention have excellent resistance to oxygen and heat. For example, when compared to sulfonated butyl rubber, e.g. having a molecular weight of 17,000, 4% isoprene as a comonomer and 4% (mole) —$SO_3$, containing no cyclic unsaturation, the instant compositions, e.g. molecular weight of 25,000, 4% isoprene and 4% cyclopentadiene as comonomers, show no modulus loss and only 20% tensile loss as compared to 50% modulus loss and 50% tensile loss for the sulfonated butyl rubber, after air aging at 100°C for 90 hours.

The low molecular weight compositions of this invention, because of the aforementioned surprising physical properties, can be used also as solventless coatings. For this purpose, the rubber is compounded with a nonvolatile preferential plasticizer as defined in U.S. Ser. No. 103,902, now abandoned. In practice, the material is heated to a temperature where the plasticizer becomes active sufficiently to cause flow by weakening the ionic associations. It is recognized that the viscosity of the melt will be low due to the low molecular weight of the backbone polymer. By conventional techniques a film can be extruded for coating. As it cools, the ionic bonds reform and the elasticity is regained.

Similarly, it is recognized that the compositions of this invention can by the same techniques be injection molded, extruded, or calendered to form elastomeric articles. The high or low molecular weight products can be used for this purpose. The lower molecular weight polymers are preferred for ease of processing. The sulfonated terpolymers of the instant invention may be used as solventless coatings, by forming a powder from a mixture of the sulfonated terpolymers and a preferential plasticizer for the ionic bonds. This powder may be sprayed or dusted onto a hot surface above the temperature of plasticizer activation so as to promote fusion of the particles into a film. Upon subsequent cooling, the product retains its inherent strength. Alternatively, the powder may be placed on a cold surface (below the plasticizer activation temperature) and the surface may then be heated. Again, the low molecular weight compositions are preferred for ease of flow at the low shear rates.

The high molecular weight materials of the instant invention, while not preferred for coatings compositions, have useful properties such as good heat, air and ozone resistance; low permeability to gas; etc. The high molecular weight compositions may be used in applications heretofore utilizing sulfonated butyl rubber, e.g. tire tubes and liners, sheeting, tire curing bags, etc.

The following are specific embodiments of the instant invention:

EXAMPLE 1

In order to display effective network properties with low molecular weight polymers, the minimum level of sulfonation (required to produce an adequate degree of physical crosslinking) must be specified.

An isobutylene-cyclopentadiene copolymer having $Mn=36,000$ and 11 mole % cyclopentadiene as a model system was sulfonated in pure hexane using a complex of dioxane/$SO_3$ and neutralized to form $SO_3^-K^+$ units. The procedures have been discussed at length in U.S. Pat. No. 3,642,728. The products were formed using a volatile preferential plasticizer (n-$C_4H_9OH$) at 15% on polymer weight in the manner described by U.S. Ser. No. 103,907. Sulfonation levels of 1.0 to 4.0 mole % $SO_3^-K^+$ were used and the resultant products were swollen in cyclohexane. The % weight swell was corrected for extractables. The results are displayed in FIG. 1. Shown on the graph also is the swell and extractability (in cyclohexane) of a well cured butyl rubber (1.9 mole % isoprene, $Mn\sim250,000$; 100 phr - polymer, 5 phr - ZnO, 1 phr - stearic acid, 2 phr - $S_8$, 1 phr - tetramethyl thiuram disulfide, cured 40 minutes at 315°F). It is evident from the FIGURE that a technologically acceptable degree of network formation with little soluble (non-network) material has been achieved in the sulfonated polymer even though it has a low molecular weight.

EXAMPLE 2

With a target of 4.0 mole % $SO_3K$, the use of different sulfonation reagents with the isobutylene cyclopentadiene model copolymer was tested. The dioxane:$SO_3$ and $(EtO)_3PO:SO_3$ and $(EtO)_3PO:(SO_3)_3$ reagents were employed using procedures detailed in U.S. Pat. No. 3,642,728 as well as an acetyl sulfate reagent. A degree of neutralization of 2 (over-neutralization - see U.S. Pat. No. 3,642,728) was employed for the dioxane and $(EtO)_3PO$ complexes while this quantity was tested at two levels for the acetyl sulfate reagent. The degree of swelling and extractability in cyclohexane was noted for the samples as well as for the cured butyl rubber of Example 1. The results are given in Table I. It was found that the dioxane:$SO_3$ and $(EtO)_3PO:SO_3$ complexes produced well physically bonded low molecular weight polymers of the isobutylene-cyclopentadiene (runs 1 and 2) while $(EtO)_3PO:(SO_3)_3$ (run 3) was poorer and the acetyl sulfate was very poor (runs 4 and 5). When sulfonated properly, the network formation in the low molecular weight isobutylene copolymer is in the same range as that of the sulfur cured butyl rubber (compare runs 1, 2 and 6).

TABLE I

MODEL SULFONATION OF
ISOBUTYLENE-CYCLOPENTADIENE (8.2 mole %)
COPOLYMER ($M_n \sim 36,000$) BY DIFFERENT REAGENTS

| Run No. | Complex | Neutra-lization Ratio | Cyclohexane % Weight Swell | % Extractable |
|---|---|---|---|---|
| 1 | Dioxane: $SO_3$ | 2 | 356 | 4.0 |
| 2 | $(EtO)_3PO: SO_3$ | 2 | 310 | 4.0 |
| 3 | $(EtO)_3PO: (SO_3)_3$ | 2 | 530 | 12.9 |
| 4 | Acetyl sulfate | 1.4 | ∞ | ~95. |
| 5 | Acetyl sulfate | 3.5 | ∞ | ~95. |
| 6 — Cured Butyl 268 | None | None | 400 | 2.5 |

EXAMPLE 3

Products were tested for the level of elastic response under stress. Low molecular weight isobutyleneisoprene (5%) copolymer with a viscosity average molecular weight of ~58,000 was cured in a GMF system and a sulfur system. An isobutylene-cyclopentadiene (8%) copolymer ($Mv \sim 55,000$) was cured in these systems as was an isobutylene-isoprene (5%) - cyclopentadiene (5%) terpolymer ($Mv \sim 70,000$). These base polymers were also sulfonated by dioxane:$SO_3$ and neutralized to 4.0 mole % $SO_3^- K^+$ and compared. The preparation of the products is detailed in Table II. The rubbers were pulled at a rate of 5 inches/minute to determine tensile strength and elongation at break and the modulus at 100% strain. A slower pull rate (of 0.5 inch/minute) was also used to determine the 100% modulus so that a more quantitative measure of elastic equilibrium might be seen. Finally, the swell and extractability in cyclohexane were obtained. The data are listed in Table II. It is evident that in each case the sulfonated polymers achieved a much higher degree of elastic response and network development (lower swell and extractability) than their chemically cured analogues. This is support for the considerably alleviated influence of free network chain ends (due to low molecular weight) on the elastic response in the sulfonated polymers.

TABLE II

ANALYSIS OF LM POLYMER NETWORKS

| Run No. | Isobutylene Polymer Sample | Cure* System | Cure Conditions | Pull Rate = 5"/min 100% Modulus (lb/in²) | Tensile Strength lb/in² | % Elongation | 0.5"/min. 100% Modulus lb/in² | Cyclo-$C_6$ % Weight Swell | % Ex-tractable |
|---|---|---|---|---|---|---|---|---|---|
| 1 | (5% isoprene) | GMF | 2.5 hrs./220°F. | 32 | 146 | 320 | 28 | 562 | 20.7 |
| 2 | $Mv \sim 58,000$ | GMF | 1 hr/300°F. | 20 | 79 | 335 | 18 | 773 | 34.2 |
| 3 | | Sulfur | 1 hr/300°F. | 61 | 128 | 230 | 60 | 512 | 8.4 |
| 4 | Sulfonated 4.0% $SO_3^- K^+$ | None | — volatile plasticizer | 810 | 1028 | 130 | 593 | 181 | < |
| 5 | (8% cyclopentadiene) | GMF | Poor Cure | | | | | | |
| 6 | $Mv \sim 55,000$ | Sulfur | 1 hr/300°F | 91 | 519 | 360 | 88 | 338 | 9.6 |
| 7 | Sulfonated 4.0% $SO_3^- K^+$ | None | — volatile plasticizer | 555 | 1200 | 240 | 450 | 219 | <1 |
| 8 | (5% cyclopentadiene + 5% isoprene) | GMF | 2.5 hrs/220°F. | 76 | 258 | 250 | 89 | 374 | 4.4 |
| 9 | $Mv \sim 70,000$ | GMF | 1 hr/300°F. | 68 | 202 | 270 | 61 | 445 | 6.5 |
| 10 | | Sulfur | 1 hr/300°F. | 109 | 285 | 270 | 118 | 282 | 1.2 |
| 11 | Sulfonated 4.0% $SO_3^- K^+$ | None | — volatile plasticizer | 762 | 1660 | 320 | 736 | 148 | <1 |

*Systems
GMF  Polymer — 100 PHR, $PbO_2$ — 7.2 PHR, GMF — 3.5 PHR
Sulfur  Polymer — 100 PHR, ZnO — 15 PHR, Stearic Acid — 2 PHR, $S_8$ — 3.5 PHR, Tellurium diethyl dithiocarbamate — 1.75 PHR

EXAMPLE 4

Air aging studies were conducted on the sulfur cured samples of Table II and their sulfonated analogues. Table III presents the results of a 90 hour aging at 100°C. Tensile, 100% modulus, and elongation were determined. The aging of polymers containing copolymerized cyclopentadiene (CPD) is surprisingly superior to those with enchained isoprene. This is observed for both the sulfonated and unsulfonated products. The rate of degradation appears to be in the following descending order for the enchained unsaturated monomers: isoprene > isoprene + CPD≈CPD.

Therefore, if good aging is demanded in very low molecular weight sulfonated isobutylene rubbers, CPD or CPD with isoprene enchainment would be preferred over isoprene alone. The reason is that a single chain cleavage would considerably alter the elastic response in very low molecular weight (Mn~5,000–20,000) sulfonated networks. Cleavage of the double bond in the cyclic structure however would leave the chain intact.

TABLE III

AGING OF LOW MOLECULAR WEIGHT ISOBUTYLENE COPOLYMERS FOR 90 HOURS AT 100°C.

| T=100°C Aging Time | Property | Table II Run No.: 3 Isobutylene-isoprene copolymer Sulfur Cure | 4 Sulfonated Isobutylene-isoprene copolymer | 6 Isobutylene-cyclopentadiene copolymer Sulfur Cure | 7 Sulfonated Isobutylene-cyclopentadiene copolymer | 10 Isobutylene-isoprene-cyclopentadiene terpolymer Sulfur Cure | 11 Sulfonated Isobutylene-isoprene-cyclopentadiene terpolymer |
|---|---|---|---|---|---|---|---|
| 0 | Tensile lb./in.$^2$ | 128 | 1028 | 519 | 1200 | 285 | 1660 |
|   | Modulus (100%) | 61 | 810 | 91 | 555 | 109 | 762 |
|   | % Elong. | 230 | 130 | 360 | 240 | 270 | 320 |
| 90 hrs. | Tensile lb./in.$^2$ | 153 | 471 | 244 | 861 | 229 | 1321 |
|   | Modulus (100%) | 81 | 471 | 122 | 720 | 118 | 885 |
|   | % Elong. | 180 | 100 | 150 | 175 | 200 | 200 |

EXAMPLE 5

The sulfonated products of the present invention were tested for resistance to ozone and compared to the GMF cured analogues. The samples, conditions of the test, and the results are listed in Table IV.

TABLE IV

ANALYSIS OF OZONE RESISTANCE OF LOW MOLECULAR WEIGHT ISOBUTYLENE COPOLYMERS (100 PPHM O$_3$ IN O$_2$)

| Table II Run No. | Sample Constitution | % Strain | Result |
|---|---|---|---|
| 1 | Isobutylene-isoprene copolymer GMF Cure | 50% | Broke at jaw after 48 hr. |
| 8 | Isobutylene-isoprene-cyclopentadiene terpolymer-GMF Cure | 50% | |
| 4 | Isobutylene-isoprene copolymer-4.0% SO$_3$K | 30% | Intact after 1,000 hr. with no surface cracking. |
| 7 | Isobutylene-cyclopentadiene copolymer-4.0% SO$_3$K | 30% | |
| 11 | Isobutylene-isoprene-cyclopentadiene terpolymer-4.0% SO$_3$K | 30% | |

A lower strain was used for the sulfonated products (Nos. 4, 7, 11) because they develop much higher stress than the chemically cured systems (Nos. 1, 8) - see Table II.

It is evident from Table IV that the preferred products of the present ivention have excellent ozone resistance.

What is claimed is:

1. A sulfonated terpolymer comprising a terpolymer of an isoolefin, an acyclic conjugated diene, and a cyclic diolefin, said terpolymer comprising from 80 to 96% by weight of said isoolefin, from 1 to 10% by weight of said acyclic conjugated diene, and from 3 to 10% by weight of said cyclic diolefin, having from 1 to 8 mole % sulfonic acid groups attached thereto.

2. The composition of claim 1 wherein said terpolymer has a molecular weight of from 5,000 to 250,000.

3. The composition of claim 2 wherein said isoolefin has from 4 to 8 carbon atoms.

4. The composition of claim 3 wherein said acyclic conjugated diene has from 4 to 7 carbon atoms.

5. The composition of claim 4 wherein said cyclic diolefin has from 5 to 12 carbon atoms.

6. The composition of claim 5 wherein said sulfonic acid groups are neutralized with a basic material.

7. The composition of claim 6 wherein said basic material is selected from the group consisting of ammonia, amines, basic metal salts and organometallic compounds.

8. The composition of claim 1 in combination with a preferential plasticizer.

9. The composition of claim 8 wherein said plasticizer is a compound containing at least one functional group having a bond moment of from 1.2 to 5.5 debyes.

10. The composition of claim 9 wherein said plasticizer is a $C_1$ to $C_{10}$ alcohol.

11. The composition of claim 10, wherein said composition comprises from 3 to 30% by weight of said alcohol based on the weight of terpolymer.

12. The composition of claim 1 wherein said terpolymer comprises from 4 to 20 mole percent residual unsaturation.

13. The composition of claim 1 wherein said isoolefin is selected from the group consisting of isobutylene and 3-methyl,1-butene.

14. The composition of claim 13 wherein said acyclic conjugated diene is selected from the group consisting of isoprene, butadiene, piperylene, 2,3 dimethylbutadiene and 2-methylpentadiene.

15. The composition of claim 14 wherein said cyclic diene is selected from the group consisting of cyclopentadiene, 1,3-cyclohexadiene, methylcyclopentadiene, methylcyclohexadiene, ethylcyclopentadiene, ethylcyclohexadiene and β-pinene.

16. The composition of claim 15 wherein said terpolymer comprises from 80 to 96% by weight isobutylene, from 1 to 10% by weight isoprene and from 3 to 10% by weight cyclopentadiene.

* * * * *